(12) United States Patent (10) Patent No.: US 8,876,187 B2
Rodriguez, Jr. et al. (45) Date of Patent: Nov. 4, 2014

(54) APPARATUS AND RELATED METHODS OF TARPING A FLATBED TRUCKING PAYLOAD

(71) Applicants: John Rodriguez, Jr., Baytown, TX (US); William Vernon Lancon, III, Anahuac, TX (US)

(72) Inventors: John Rodriguez, Jr., Baytown, TX (US); William Vernon Lancon, III, Anahuac, TX (US)

( * ) Notice: Subject to any disclaimer, the term of this patent is extended or adjusted under 35 U.S.C. 154(b) by 0 days.

(21) Appl. No.: 13/765,638

(22) Filed: Feb. 12, 2013

(65) Prior Publication Data

US 2014/0225393 A1 Aug. 14, 2014

(51) Int. Cl.
*B60P 7/04* (2006.01)
(52) U.S. Cl.
CPC ................................... *B60P 7/04* (2013.01)
USPC ............................... 296/98; 242/390.2
(58) Field of Classification Search
USPC .......... 296/98, 101, 181; 212/328; 242/390.2, 242/598.5, 557, 96, 403, 533.8, 598
See application file for complete search history.

(56) References Cited

U.S. PATENT DOCUMENTS

| | | | | |
|---|---|---|---|---|
| 2,562,300 | A * | 7/1951 | Dingman | 296/98 |
| 6,805,395 | B2 * | 10/2004 | Royer | 296/98 |
| 7,669,911 | B1 * | 3/2010 | Hankey | 296/100.1 |
| 2012/0001010 | A1 * | 1/2012 | Payne | 242/390.2 |

* cited by examiner

*Primary Examiner* — Joseph D Pape
*Assistant Examiner* — Dana Ivey
(74) *Attorney, Agent, or Firm* — John K. Buche; Buche & Associates, P.C.

(57) ABSTRACT

Generally disclosed is a device for simply and inexpensively tarping the payload of any truck bed without placing the tarper, the tarp, or the payload in danger of injury. In a preferred embodiment, the disclosed device generally comprises: (1) a rolled or bunched tarp that is installed on a first portable and adjustable riser; (2) a cable and cable crank installed on a second portable and adjustable riser; (3) wherein the cable may be attached to the tarp so that cranking the cable crank will unroll or unbunch the tarp and suspendedly draw the same toward the second riser; and (4) wherein the risers are removable from the truck bed.

18 Claims, 4 Drawing Sheets

APPARATUS AND RELATED METHODS OF TARPING A FLATBED TRUCKING PAYLOAD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This specification describes subject matter in the field of apparatus and related methods for tarping payloads.

2. Background of the Invention

Frequently payloads are loaded on trailers for transport to a destination. Just as frequently, said payloads must be protected from the elements during travel. One simple and inexpensive method of protecting such payloads from the elements is by covering the same with a tarp (also known as tarping the payload). The most basic form of tarping requires a tarper (usually the driver of the truck carrying the payload) to climb over the playload while simultaneously dragging and tucking the tarp around the shipment.

Although basic tarping of the payload is a simple and inexpensive, basic tarping poses threats to the tarper, the tarp, and the payload. First, the tarper, while climbing around on the payload, is at risk of injury via falling of the trailer. Risks of a tarper falling off the trailer are increased in windy conditions as the tarp can be blown into the tarper so that the tarper is either knocked off balance or disoriented. Second, dragging a tarp over a payload frequently results in hang-ups of the tarp so that continued pulling of the tarp can rip or otherwise damage the tarp. Finally, tarps are heavy so that the same are frequently improperly positioned over the payload by the tarper whereby the payload is at risk of damage. In view of the foregoing, a need exists for apparatus and related methods of tarping a payload that are simple and inexpensive without placing a tarper, the tarp, or the payload at risk of injury.

Various apparatus exist for tarping payloads via pulling a rolled or otherwise bundled tarp positioned at one end of the payload over the payload from an opposite end thereof while the rolled or bundled tarp unwinds. See, e.g., U.S. Pat. Nos. 667,475; 2,811,321; 5,125,713; 5,713,712; 5,743,700; 5,882,062; and 6,109,680. While these apparatus plus related methods are sometimes suitable for tarping payloads, these apparatus are not entirely suitable for payloads with drastically varying topographies, as would frequently be found on flatbead trailer payloads, because the tarp can still hang-up while being drug across the uneven surfaces of the payloads. As a result, these types of apparatus and related methods require a trailer with sidewalls and are not ideal for flat bead loads. To avoid said hang-up on uneven payloads, hang and drape type tarping apparatus are known. See, e.g., U.S. Pat. Nos. 6,273,401; 6,811,202; 7,798,344; and 7,819,262. Accordingly, a need still exists for tarping trailer loads in a simple and inexpensive way without the drawbacks of known apparatus plus methods.

SUMMARY OF THE INVENTION

With the aforementioned need in mind, it is an object of this description to disclose a device for simply and inexpensively tarping the payload of any truck bed without placing the tarper, the tarp, or the payload in danger of injury. Structurally, the disclosed device, in one embodiment, comprises: (1) a rolled tarp that is installed on a portable and adjustable riser at one end of a truck bead; (2) a cable, cable roll, and cable crank positioned on a portable and adjustable riser opposite end the truck bed; (3) wherein the cable crank may be attached to the rolled tarp so that cranking the cable crank will unroll the tarp and suspendedly draw the same toward the cable roll; and (4) wherein the risers are removable from the truck bed. Operably, the device may be used to tarp the payload of a truck bed as follows: first, positioning the risers at the front and rear of the truck bead; (2) raising the tarp roll and cable roll to a position above the top of the payload; (3) coupling the cable to the rolled tarp; (4) operating the cable crank to draw the tarp over the payload; (5) undraping the tarp from the riser so that it falls atop the payload; (6) disconnecting the cable from the tarp; and (7) securing the tarp to around the payload.

BRIEF DESCRIPTION OF THE FIGURES

The manner in which these objectives and other desirable characteristics can be obtained is explained in the following description and attached figures in which.

It is to be noted, however, that the appended figures illustrate only typical embodiments of the disclosed apparatus and methods, and therefore, are not to be considered limiting of their scope, for the disclosed apparatus and methodologies may admit to other equally effective embodiments that will be appreciated by those reasonably skilled in the relevant arts. Also, figures are not necessarily made to scale.

DETAILED DESCRIPTION OF THE PREFERRED EMBODIMENTS

Generally disclosed is a device for simply and inexpensively tarping the payload of any truck bed without placing the tarper, the tarp, or the payload in danger of injury. In a preferred embodiment, the disclosed device generally comprises: (1) a rolled or bunched tarp that is installed on a first portable and adjustable riser; (2) a cable and cable crank installed on a second portable and adjustable riser; (3) wherein the cable may be attached to the tarp so that cranking the cable crank will unroll or unbunch the tarp and suspendedly draw the same toward the second riser; and (4) wherein the risers are removable from the truck bed. Operably, the device may be used to tarp the payload of a truck bed by suspending the tarp over the payload and allowing the tarp to be lowered into position over the payload. The more specific aspects of the preferred embodiment are further disclosed with reference to the figures.

Figure 1:
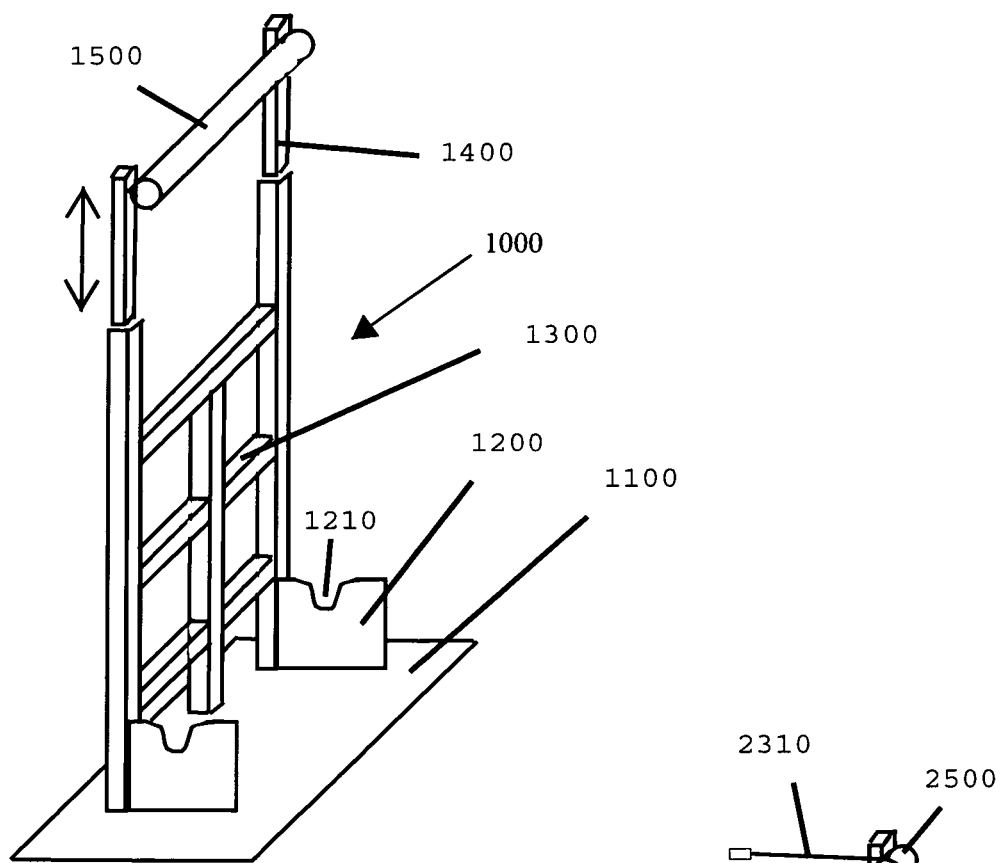
FIG. 1 is a perspective view of a first riser 1000.

FIG. 1 is a perspective view of a preferred embodiment of a first riser 1000. As shown, the first riser 1000 may suitably comprise: a base 1100; a spindle 1200; a ladder 1300; an extenders 1400; and a roller 1500. Still referring to FIG. 1, the base 1100 is preferably a foundation for uprightly supporting the riser 1000 on the back of a truck bed. As shown, the base is rectangular, but any shape is suitable. In one embodiment, the base 1100 is coupled to the stake pegs of a truck bed, but the base 1000 may also be strapped to the truck bed for added structural integrity. The spindle 1200 is preferably defined by two opposing docks 1210 for receiving an axis of a rolled tarp. In operation, a tarp axis may rotate within the docks so that the rolled tarp may be unraveled. The ladder 1300 is a series of steps 1310 that may be used by a tarper for climbing. The extenders 1400 are two poles that extend coaxially from the vertical uprights of the ladder 1300. Suitably, the height of the extenders 1400 relative to the ladder 1300 may be adjusted by a pin-locking system. Finally, a roller 1500 is positioned in between the extenders for facilitating the pulling of a tarp thereacross.

Figure 2:
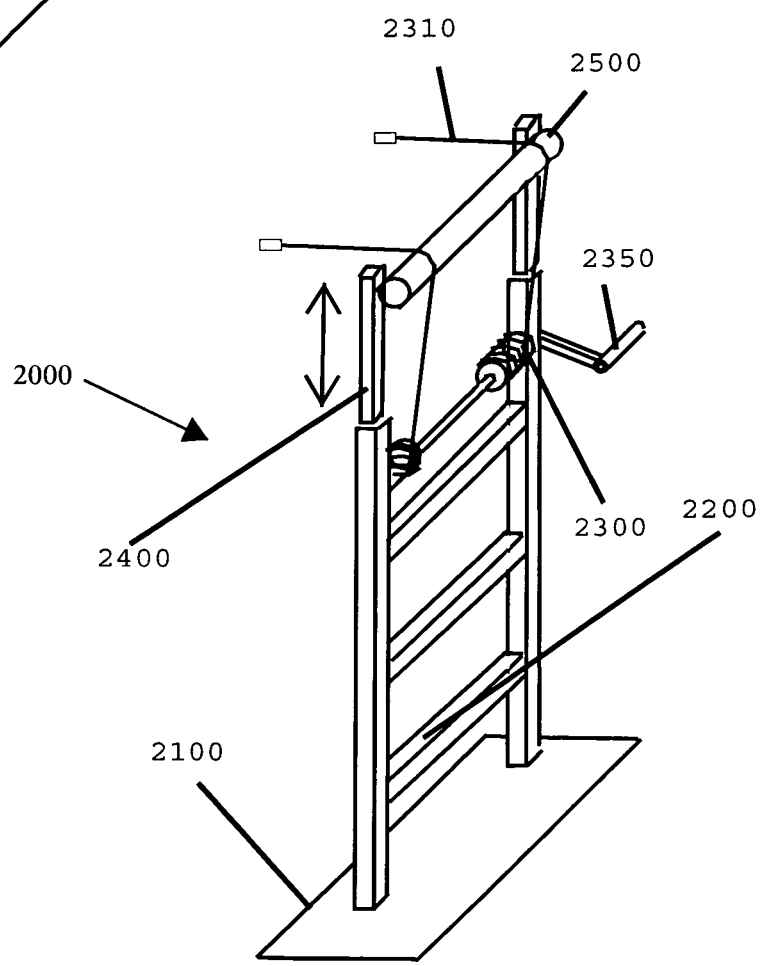
FIG. 2 is a perspective view of a second riser 2000.

FIG. 2 is a perspective view of a second riser 2000. As shown, the second riser 2000 may suitably comprise: a base 2100; a ladder 2200; rolled cords 2300 operated via a cord crank 2350; extenders 2400; and a roller 2500. Still referring to FIG. 2, the base 2100 is preferably a foundation for uprightly supporting the riser 2000 on the back of a truck bed. As shown, the base is rectangular, but any shape is suitable. In one embodiment, the base 2100 may be coupled to the stake pegs of a truck bed, but the base 2000 may also be strapped to the truck bed for added structural integrity. The ladder 1300 is a series of steps 1310 that may be used by a tarper for climbing. The cord rolls 2300 are suitably positioned in between the uprights of the ladder and operated by a cord crank 2350. In operation, the cord crank 2350 may be manipulated for extending or reeling in a cord installed on the cord rolls 2300. As with the first riser 1000, the extenders 2400 of the second riser 2000 are two poles that extend coaxially from the vertical uprights of the ladder 1300. Suitably, the height of the extenders 1400 relative to the ladder 1300 may be adjusted by a pin-locking system. Finally, a roller 1500 is positioned in between the extenders for facilitating the pulling of a cord from the cord rolls 2300 thereacross.

Figure 3:
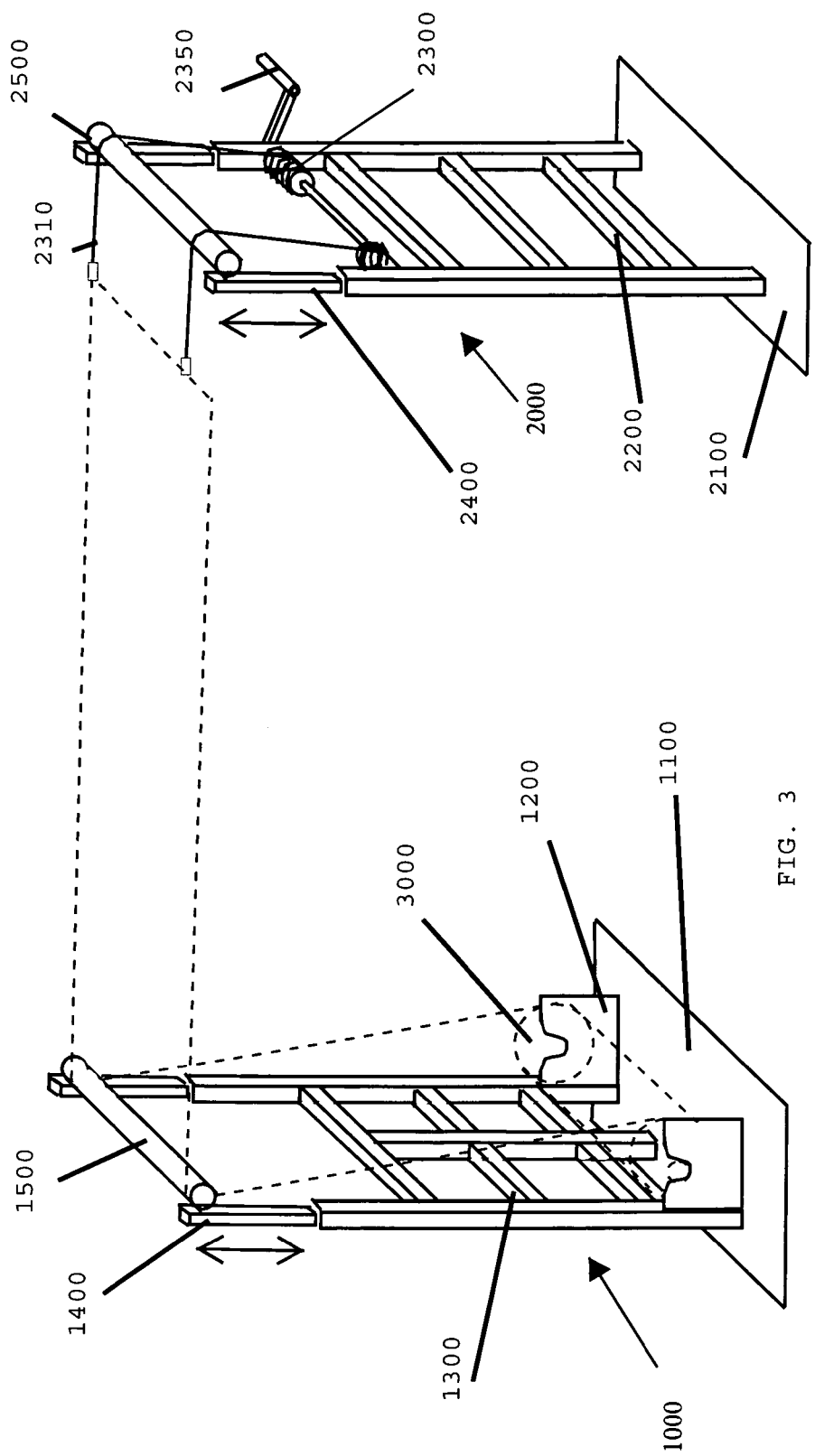
FIG. 3 is a perspective view the first and second risers 1000, 2000 operating to suspend a tarp therebetween.

FIG. 3 is a contextual view of the first and second risers 1000, 2000 being cooperatingly employed for suspending a tarp 300 therebetween. Referring to FIG. 3, the axis 3100 of a rolled tarp 3000 has been provided to the docks 1210 of the spindle 1200 of the first riser 1000. From the spindle 1200, the tarp has been threaded over the roller 1500 for coupling with the cords 2310 of the cord rolls 2300 of the second riser. It should be appreciated that a tarper may use the ladder 1300 to assist in accomplishing said threading of the tarp 3000 over the roller 1500 and said coupling of the cords 2310 and tarp. Finally, the cord crank has been operated to draw the tarp 3000 taut so that the same is suspended between the two risers 1000, 2000.

Figure 4A:
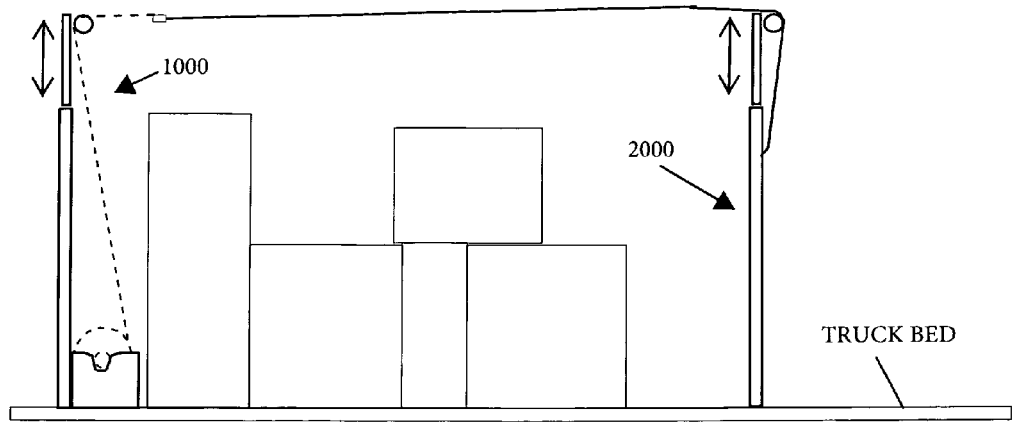
FIG. 4A is a side view of a payload positioned between the first and second risers 1000, 2000.
Figure 4B:
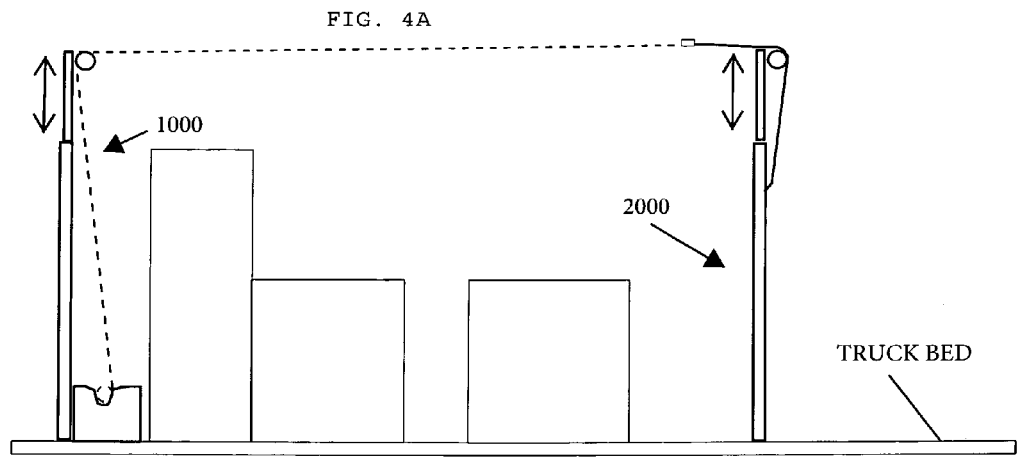
FIG. 4B is a side view of a pay load positioned between the first and second risers with a tarp suspended therebetween.
Figure 4C:
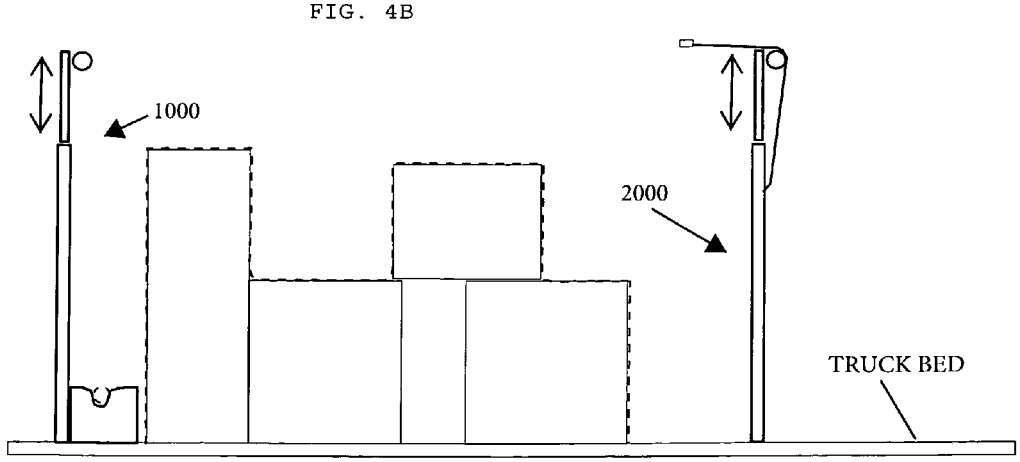
FIG. 4C is a side view of a tarped payload.
Figure 5:
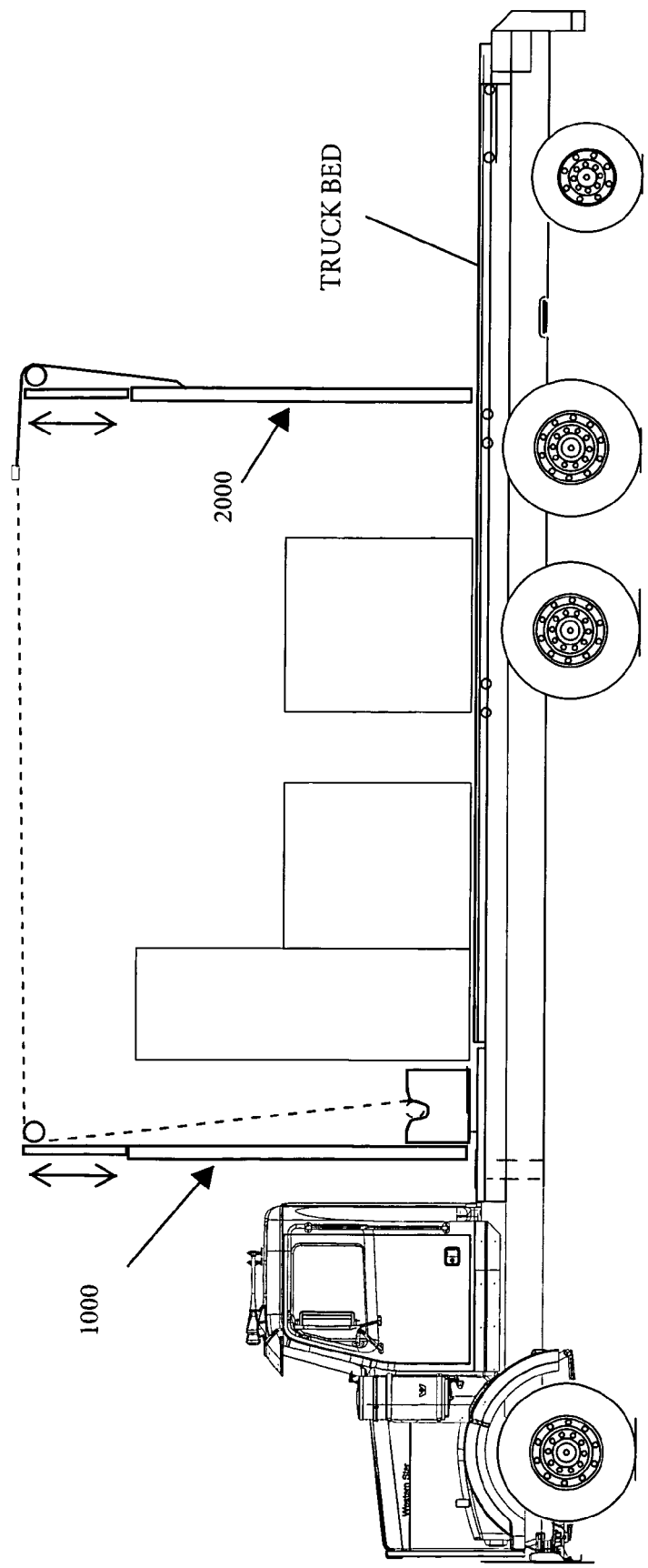
FIG. 5 is a contextual view of the apparatus 1000 installed on the truck bed.

FIGS. 4A through 4C are side views of the first and second risers 1000, 2000 installed on a truck bed. Suitably, FIGS. 4A through 4C illustrate a preferred mode of operation for the risers 1000, 2000. Referring first to FIG. 4A, the crank 2350 may be operated for slacking the cords 2310 of the cord rolls 2300. Once slacked the cords 2310 may be delivered to the first riser for coupling with the tarp. In one embodiment, the cords are manually delivered to the tarp. In another embodiment, the cords are projected to the first riser via ballistic, including harpoons or other projectiles. As shown, the risers 1000, 2000 are provided to the stake ports of a truck bed while a rolled tarp 3000 is installed in the spindle 1200 of the first riser 1000. Next, the extenders 1400, 2400 are adjusted to a height that is greater than the height of the payload. After heigh adjustment, the tarp 3000 may be threaded over the roller 1500. The ends of the cords 2310 of the second riser may be drawn across the truck bed for coupling to the threaded end of the tarp 3000. Once coupled, as shown in FIG. 4A, the crank 2350 may be operated to unroll tarp roll while concurrently drawing the tarp 3000 toward the second riser 2000 so that the same is suspended between the first and second risers 1000, 2000 (shown in FIG. 4B). Finally, as shown in FIG. 4C, the tarp 3000 may be draped over the payload so that the tarp may be protectively installed thereon. In a preferred mode of operation, the raisers 1000, 2000 may be uninstalled from the truckbed.

The disclosed apparatus may be constructed of any suitable materials and methodologies known for tarping risers. It should be noted that FIGS. 1 through 4C and the associated description are of illustrative importance only. In other words, the depiction and descriptions of the present disclosure should not be construed as limiting of the subject matter in this application. Additional modifications may become apparent to one skilled in the art after reading this disclosure.

We claim:

1. An apparatus for tarping a payload comprising:
   a first riser configured to be removably secured to a truck bed with a spindle for a rolled tarp;
   a second riser configured to be removably secured to a truck bed with a cable and a cable crank;
   wherein the cable is configured to be slacked or reeled by the cable crank;
   wherein the cable is secured to a tarp roll installed in the spindle;
   wherein the tarp roll is suspended between the first and second risers;
   wherein the first and second risers each have a base; and,
   wherein the first and second riser each comprise a ladder with uprights.

2. The apparatus of claim 1 wherein the first riser features a spindle for the rolled tarp.

3. The apparatus of claim 2 wherein the first and second risers feature extenders.

4. The apparatus of claim 3 wherein the extenders of the first and second risers are defined by poles that are coaxial to the uprights of the ladder.

5. The apparatus of claim 4 wherein the extenders of the first and second risers are electively height adjustable via said extenders of said first and second risers being configured to telescope within corresponding uprights in the first and second risers.

6. The apparatus of claim 5 wherein the extenders have rollers.

7. The apparatus of claim 6 wherein an unrolled portion of the tarp is threaded through the roller of the first riser.

8. A method of tarping a payload comprising the steps of:
   positioning two risers so that one is at the front and one is at the rear of a truck bed containing the payload;
   raising a tarp from one riser and cable from the other riser to a position above the top of the payload;
   coupling the cable to the tarp;
   operating a cable crank to draw the tarp between the risers over the payload;
   undraping the tarp from the risers so that the tarp falls atop the payload;
   disconnecting the cable from the tarp; and
   securing the tarp around the payload.

9. The method of claim 8 wherein the first and second risers each have a base.

10. The method of claim 9 wherein the first and second riser each comprise a ladder with uprights.

11. The method of claim 10 wherein the first riser has a spindle for the rolled tarp.

12. The method of claim 11 wherein the first and second risers have extenders.

13. The method of claim 12 wherein the extenders of the first and second risers are defined by poles that are coaxial to the uprights of the ladder.

14. The method of claim 13 wherein the extenders of the first and second risers are electively height adjustable via said poles telescoping within said uprights.

15. The method of claim 14 wherein the extenders feature rollers.

16. The method of claim 15 wherein an unrolled portion of the tarp is threaded through the roller of the first riser.

17. The method of claim 16 wherein the tarp is pulled over the pay load between the first and second risers via the crank and cable.

18. An apparatus for tarping a payload comprising:
a first riser defined by
(a) a base,
(b) a spindle with a roiled tarp installed on an axis of said spindle and configured to be rolled or unrolled thereon,
(c) a ladder with uprights,
(d) extenders defined by poles that coaxially merge with the ladder and are height-adjustable via telescoping within said uprights,
(e) a roller that has been threaded with an unrolled portion of the tarp from the spindle;
a second riser defined by
(a) a base,
(b) a ladder with uprights,
(c) extenders defined by poles that coaxially merge with the ladder and are height-adjustable via telescoping within said uprights,
(d) a coiled cord operably coupled to a crank, wherein the crank is configured to slack or reel the cord,
(e) a roller that has been contacted by the cord so that one end of the cord can be extended for contact with the tarp.

* * * * *